United States Patent Office 3,579,498
Patented May 18, 1971

3,579,498
METHOD OF MAKING AZO, 3-SUBSTITUTED PYRAZOLONE DYES
William Paul Dunworth, Wilmington, Del., assignor to E. I. du Pont de Nemours and Company, Wilmington, Del.
No Drawing. Continuation-in-part of application Ser. No. 594,352, Nov. 15, 1966. This application Nov. 6, 1967, Ser. No. 680,968
Int. Cl. C09b 29/38, 31/14, 33/12
U.S. Cl. 260—158
8 Claims

ABSTRACT OF THE DISCLOSURE

Arylazo-, aryl disazo-, and benzothiazolylarylazo-1,3-substituted-5-pyrazolones, for example,

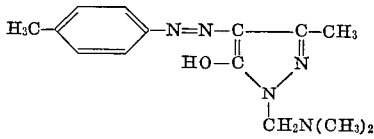

and

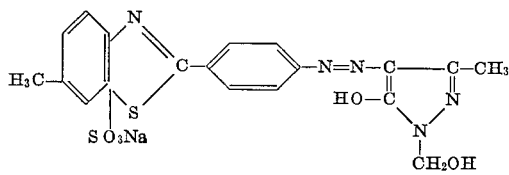

useful as paper dyes having good water solubility, bleachability, brightness, lightfastness and tinctorial strength, and as intermediates for cationic dyes which in turn are useful in dyeing acid modified acrylic, polyester and polyamide fibers.

CROSS-REFERENCE TO RELATED APPLICATION

This is a continuation-in part of my copending application Ser. No. 594,352, filed Nov. 15, 1966 and abandoned Jan. 5, 1968.

BACKGROUND OF THE INVENTION (1) Field of the invention

This invention relates to a novel method of preparing azo pyrazolone dyes and to certain novel yellow thiazole-pyrazolone dyes prepared by the process.

(2) Description of the prior art

There has long been a need in the trade for a yellow dye for paper which possesses significantly improved water solubility over those dyes currently utilized. Further, there has been a need for inexpensive methods of preparing azo pyrazolone dyes.

SUMMARY OF THE INVENTION

It has now been discovered that azo, 3-substituted pyrazolone dyes of thestructure:

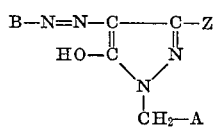

wherein B is

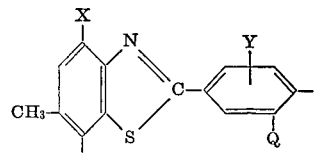

Ar- or Ar-N=N-Ar' in which
X and Y are H or $CH_3$; one of P or Q is $SO_3M$ and the other is H or $SO_3M$ wherein M is an alkali metal or an ammonium cation;
Ar is a phenyl or naphthyl group which is substituted with 0 to 3 substituents selected from the group consisting of Cl, Br, $NO_2$, CN, alkyl, alkoxy, $CF_3$, phenylcarbonyl, phenylsulfonyl, N,N-di alkyl carboxamido and N,N-di alkyl sulfonamido; and
Ar' is phenylene, naphthylene or biphenylylene which is substituted with 0 to 2 substituents selected from the group consisting of alkyl and $C_{1-4}$ alkoxy groups;
Z is —$CH_3$ or

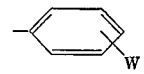

in which W is H, Cl, Br, $NO_2$, alkyl, or alkoxy and is in the meta or para position; and
A is —OH or

in which $R^1$ and $R^2$ are hydrogen, alkyl, —$CH_2CH_2OH$,

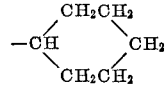

or together with the attached nitrogen form an alicyclic ring of the structure:

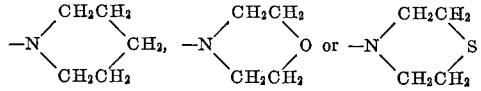

can be prepared by a simple and economical process which comprises reacting an azo pyrazolone compound of the structure:

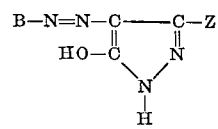

with at least one mole of a member selected from the group consisting of formaldehyde and agents yielding formaldehyde. Optionally the reaction is carried out in the presence of an amine of the structure:

in which $R^1$ and $R^2$ are hydrogen, alkyl, —$CH_2CH_2OH$,

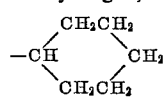

or together with attached nitrogen form an alicyclic ring of the structure:

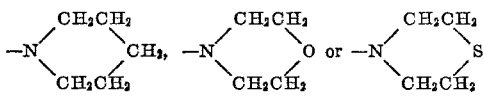

The terms "alkyl" and "alkoxy", as employed above and throughout this specification in the definitions of "Ar," "Ar'," "Z," "R¹" and "R²," refer to such group having 1 to 4 carbon atoms.

The preferred products of the process of this invention are the yellow azo thiazole-pyrazolone dyes of the structure:

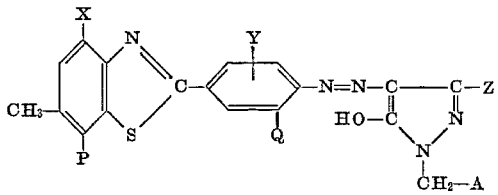

wherein X and Y are H or CH₃, one of P or Q is SO₃M and the other is H or SO₃M wherein M is an alkali metal or an ammonium cation; Z is alkyl and A is —OH, —NH₂, —NHCH₃, —NHC₂H₅, —N(CH₃)₂, —N(C₂H₅)₂

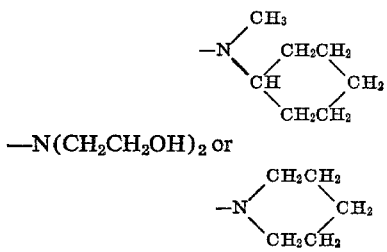

—N(CH₂CH₂OH)₂ or

These dyes have significantly improved solubility in water and are essentially substantive to cellulosic fibers and, accordingly, have significant utility for coloring paper pulp yellow.

Particularly preferred azo thiazole-pyrazolone dyes are of the formula:

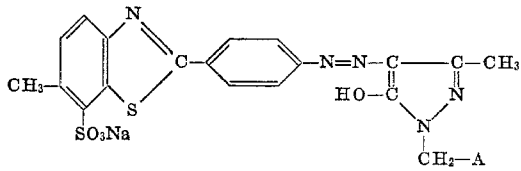

in which A is —OH, —N(CH₃)₂ or —N(CH₂CH₂OH)₂.

Other important products of the process of this invention are aryl monoazo and disazo pyrazolone dye bases of the structure:

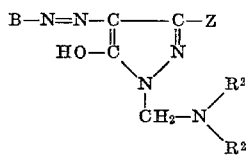

wherein B is Ar— or Ar—N=N—Ar' in which

Ar is a phenyl or naphthyl group which is substituted with 0 to 3 substituents selected from the group consisting of Cl, Br. NO₂, CN, alkyl, alkoxy, CF₃, phenylcarbonyl, phenylsulfonyl, N,N-di- alkyl carboxamido and N,N-di- alkylsulfonamido; and Ar' is phenylene, naphthylene or biphenylene, which is substituted with 0 to 2 substituents selected from the group consisting of alkyl and alkoxy groups;

Z is —CH₃ or

in which W is H, Cl, Br, NO₂, alkyl or alkoxy and is in the meta or para position;

R¹ and R² are alkyl or together with the attached nitrogen form an alicyclic ring of the structure

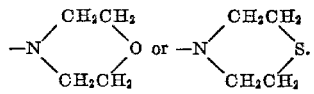

These dye bases are intermediates for the preparation of cationic dyes which are useful for dyeing acid-modified synthetic fibers.

Particularly preferred aryl azo pyrazolone dye bases are of the structure

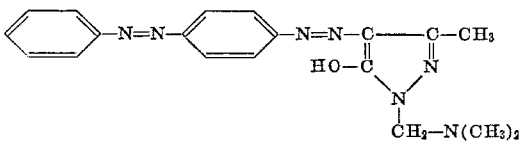

and

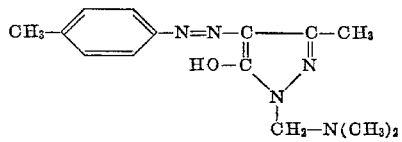

DESCRIPTION OF THE INVENTION (1) Azo thiazole-pyrazolone dyes

The process for preparing the azo thiazole-pyrazolone dyes of this invention involves the following steps:

(a) diazotization of dehydrothio-p-toluidine sulfonic acid,
(b) coupling to 3-methyl-5-pyrazolone,
(c) reaction with formaldehyde, or an agent yielding formaldehyde,
(d) optionally, simultaneous reaction of selected amines and formaldehyde in step (c), or subsequent reaction of selected amines.

In step (a), a dehydrothio-p-toluidine sulfonic acid is dissolved in aqueous alkali to yield a clear solution with a pH of about 9 to 10. While maintaining the solution at 22±3° C., sodium nitrite is added. This solution, then, is added to a hydrochloric acid solution, keeping the temperature below 25° C. to effect diazotization. This diazotization must be conducted under strongly acidic conditions; the solution should be acid to Congo Red paper, i.e., at a pH of 2.8 or less.

3-methyl-5-pyrazolone, the coupler for step (b) is dissolved in aqueous alkali. To effect the coupling reaction, the diazo solution of step (a) is added to the coupler (present in slight excess up to about 10% over the theoretical requirement) solution while maintaining the temperature below 25° C., preferably at 12±4° C. to minimize side reactions, and the pH at 6 or above, preferably at 8–11.

When the coupling reaction of step (b) is complete, the clear red solution, which may contain some precipitated dye, is warmed to 23±3° C. and aqueous formaldehyde is added to yield the hydroxymethyl derivative of the dye, step (c). The reaction with formaldehyde can take place as low as 5–10° C. but occurs at a convenient rate at 23±3° C., or higher. The formaldehyde may be added in an amount ranging from stoichiometric quantities to a 50% molar aecess, bxsed on total coupler. Following agitation for about 30 minutes at an alkaline pH, preferably at pH 8 to 11, the reaction mass is warmed to about 70° C., whereupon salt is added to induce precipitation. The precipitated, hydroxymethyl dye derivative may be isolated by filtration and dried at 100°±10° C.

To effect the subsequent reaction with selected amines, step (d), the procedure of steps (a–c) is followed through the addition of formaldehyde and 30 minutes at an alkaline pH, preferably at pH 8 to 11. When complete solution is obtained, amine is added either neat or, in the case of gaseous amines as an aqueous solution, in an amount stoichiometrically equivalent to that of the formaldehyde used. Since all the amines used are relatively strong bases, the reaction mixture will definitely be alkaline at this point, preferably with a pH of 8–11. Agitation is continued one hour further. The mixture is then heated to about 70° C., the pH adjusted 8–8.5, and salt added to induce precipitation. The dye is then isolated by filtration.

As apparent from the preceding similar reaction conditions for reaction with formaldehyde and subsequent reaction with amines, the two reagents may be added simultaneously to yield substantially the same results. Furthermore, because of the greatly improved water-solubility of the dyes of this invention, isolation of the solid product is unnecessary. Thus, alternatively, the dyes of this invention may be isolated and used directly in solution form; said solution may contain between 7–20% active ingredient. In making solutions, it is frequently convenient to isolate the intermediate solid diazo component redisperse in fresh water to reduce the inorganic salt content of the final dye solution.

The azo thiazole-pyrazolone dyes of this invention have significantly improved water solubility over the dyes currently used for paper dyeing. The main advantages to be derived from improved solubility are those of cost and convenience. Thus, if mills employing continuous coloring techniques can prepare and store a concentrated dye solution $n$ times more concentrated than usual, they need $1/n$ as much volume for preparation and storage tanks, or alternatively need prepare the solution $1/n$ times as often for a given tank volume.

Improved solubility can also be beneficial in that concentrated aqueous solutions of dye can be manufactured for the trade. This will also eliminate the necessity of weighing or otherwise working with solid dye powders. Improved solubility will also permit the preparation of more concentrated solutions of dye in aqueous starch solutions so that paper can be "surface colored" in deeper shades at the size press.

In addition to improved solubility, the novel yellow paper dyes of the present invention also possess the useful property known in the trade as bleachability. It is important in the paper industry to be able to provide dyed pulp and paper which are easily bleached, e.g., with chlorine or chlorine containing compounds, so that any trimmings, or so-called broke, can be bleached and re-used immediately in other grades of paper, including white. Finally, the dyes of the present invention possess good brightness and lightfastness, and exhibit outstanding tinctorial strength on paper, which properties are desirable in the trade.

The thiazole-pyrazolone dyes of this invention are typically used to dye paper by beating a mixture containing bleached sulfite pulp, the dye, rosin size and alum. The amount of dye employed may be varied from about 0.05 to 25.0 parts to give lightly tinted to deeply colored dyeings. The percent by weight of bleached sulfite pulp in the initial slurry may vary from 0.25 to about 6. Likewise, the amount of rosin size and alum used in the process may vary from about 5 to 25 parts, and from about 10 to 35 parts, respectively, or these additives may be omitted. The use of rosin size is omitted when paper stock for use in colored tissue and the like is being dyed with the azo thiazole-pyrazolone paper dyes of this invention.

If desired, the novel azo thiazole-pyrazolone dyes of this invention may be used for the coloration of paper in the presence of wet strength agents or in the presence of dye retention aids other than size and alum, which agents and aids are well known in the art of paper making. Although dyeings may be performed at pH values of about 7, it is preferred to use additives in the dye liquor which provide a pH of about 6 or below. Ordinary rosin size contains both free rosin and sodium rosinate, and its solution has a pH of about 11–12. A solution of paper-maker's alum has a pH of about 3. Thus, by mixing these two additives, one readily adjusts the pH of the dye liquor to the desired value of about pH 6, or lower for sized papers.

The beater dyeing method for the coloration of paper is well known in the art of paper making. A specific example is shown in Example 4. The beater, used in paper manufacture, is defined in the Van Nostrand Chemists Dictionary, 1953, p. 69, as ". . . a tank in which the pulp-water mixture is agitated and cut by means of rotating blades, until the fibers have been separated and reduced in length to the degree desired before they pass to the Fourdriner" (the actual sheet-forming apparatus). An extensive discussion of the beater dyeing method is found in the book, "Pulp and Paper Manufacture," volume 2, Preparation of Stock for Paper Making, McGraw-Hill, 1951, pages 492–509.

(2) Aryl monoazo and disazo pyrazolone dye bases

The aryl monoazo and disazo pyrazolone dye bases which can be produced by the process of this invention are of the structure:

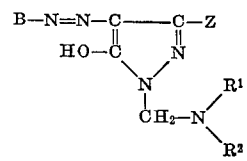

wherein B is Ar— or Ar—N=N—Ar' in which

Ar is a phenyl or naphthyl group which is substituted with 0 to 3 substituents selected from the group consisting of Cl, Br, $NO_2$, CN, alkyl, alkoxy, $CF_3$, phenylcarbonyl, phenylsulfonyl, N,N-di alkyl carboxamido and N,N-di-alkylsulfonamido; and Ar' is phenylene, naphthylene or biphenylene, which is substituted with 0 to 2 substituents selected from the group consisting of alkyl and alkoxy groups.

Z is —$CH_3$ or

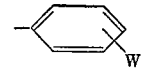

in which W is H, Cl, Br, $NO_2$, alkyl or alkoxy and is in the meta or para position; and $R^1$ and $R^2$ are alkyl or together with the attached nitrogen form an alicyclic ring of the structure

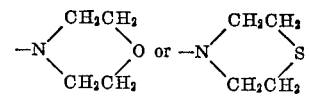

The total process for preparing these dye bases which includes the reaction of this invention, involves the following steps:

(a) diazotizing an aryl amine, B—$NH_2$, with $NaNO_2$ and a mineral acid, HX' to form a diazo, B—$N_2^{\oplus}X'^{\ominus}$ (b) coupling the diazo to a pyrazolone,

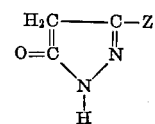

to form an azo pyrazolone,

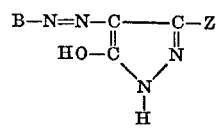

(c) reacting the azo pyrazolone with formaldehyde and a secondary amine, R¹—NH—R², to form a dye base,

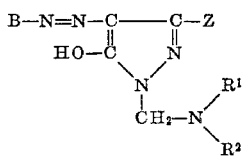

(a) Diazotization reaction

The arylamines which are useful in preparing aryl azo pyrazolone dye bases are of the formula Ar—NH$_2$ or Ar—N=N—Ar'—NH$_2$ in which Ar is phenyl or naphthyl group which is substituted with 0 to 3 substituents selected from the group consisting of Cl, Br, NO$_2$, CN, alkyl, alkoxy, CF$_3$, phenylcarbonyl, phenylsulfonyl, N,N-di alkyl carboxamido and N,N-dialkylsulfonamido, and Ar' is phenylene, naphthylene or biphenylene, which is substituted with 0 to 2 substituents selected from the group consisting of alkyl and alkoxy groups.

Suitable arylamines of the formula Ar—NH$_2$ which are useful in preparing the monoazo basic dyes include aniline,
o-, m-, and p-chloroaniline,
o-, m-, and p-bromoaniline,
o-, m-, and p-anisidine,
o-, m-, and p-toluidine,
2,3-, 2,4-, 2,5-, 2,6-, 3,4- and 3,5-xylidine,
2,5-dichloroaniline,
3,4-dichloroaniline,
2-chloro-4-nitroaniline,
o-, m- and p-nitroaniline,
2-methyl-5-isopropylaniline,
2,4,6-trichloroaniline,
2,4,6-tribromoaniline,
3,5-dibromo-4-aminotoluene,
2,4-dibromoaniline,
2-trifluoro-methyl-4-chloroaniline,
2-trifluoromethylaniline,
m- and p-aminodiphenylmethane,
o-, m- and p-ethylaniline,
2-isopropyl-5-methylaniline,
2,6-dichloro-4-nitroaniline,
4-aminobenzophenone,
2-methyl-4-nitroaniline,
2-chloro-5-nitroaniline,
p-cyanoaniline,
2-methoxy-5-nitroaniline,
4-amino-3,5-dibromobenzophenone,
2,4-dinitro-6-bromoaniline,
4-nitro-2-cyanoaniline,
2,4-dicyanoaniline,
3-chloro-4-cyanoaniline,
2-cyano-5-chloroaniline,
3,4-dicyanoaniline,
2,5-dicyanoaniline,
2-chloro-4-cyanoaniline,
2,4-dinitroaniline,
2-amino-5-nitroanisole,
3-nitro-4-aminotoluene,
2,4-dichloroaniline,
2,5-dichloro-4-nitroaniline,
2-cyano-4,6-dinitroaniline,
2-cyano-6-bromo-4-nitroaniline,
2-cyano-5-chloro-4-nitroaniline,
2-aminodiphenylsulfone,
4-aminodiphenylsulfone,
2,5-diethoxyaniline,
2,5-dimethoxyaniline,
2-butoxy-5-methoxyaniline,
2-butyl-5-methoxyaniline,
o- and p-phenetidine,
o- and p-propylaniline,
o- and p-propoxyaniline,
2,4,5- and 2,4,6-trimethylaniline,
p-butylaniline,
2-N',N'-dimethylsulfamyl-4-nitroaniline,
N'-dimethylsulfamyl-4-nitroaniline,
2-benzoyl-4-nitroaniline,
2-chloro-4-N',N'-dimethylsulfamylaniline,
2,5-dichloro-4-N',N'-dimethylsulfamylaniline,
2,6-dintro-4-N',N'-dimethylsulfamylaniline,
2,6-dibromo-4-nitroaniline,
1-naphthylamine,
6-methyl-2-naphthylamine,
5-nitro-2-naphthylamine,
4-nitro-1-naphthylamine,
2,4-dinitro-1-naphthylamine,
1-amino-2-methylnaphthalene, and
2-ethoxy-1-naphthylamine.

Aniline and p-toluidine are preferred.

Suitable azo arylamines of the formula

Ar—N=N—Ar'—NH$_2$ which are useful in preparing disazo dye bases of this invention include aminoazobenzene,

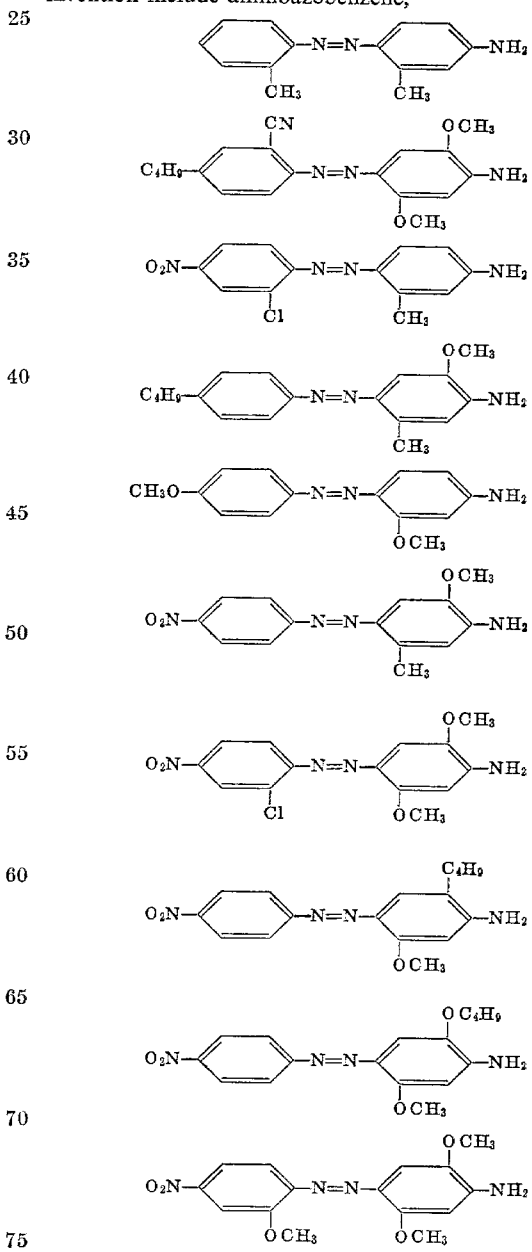

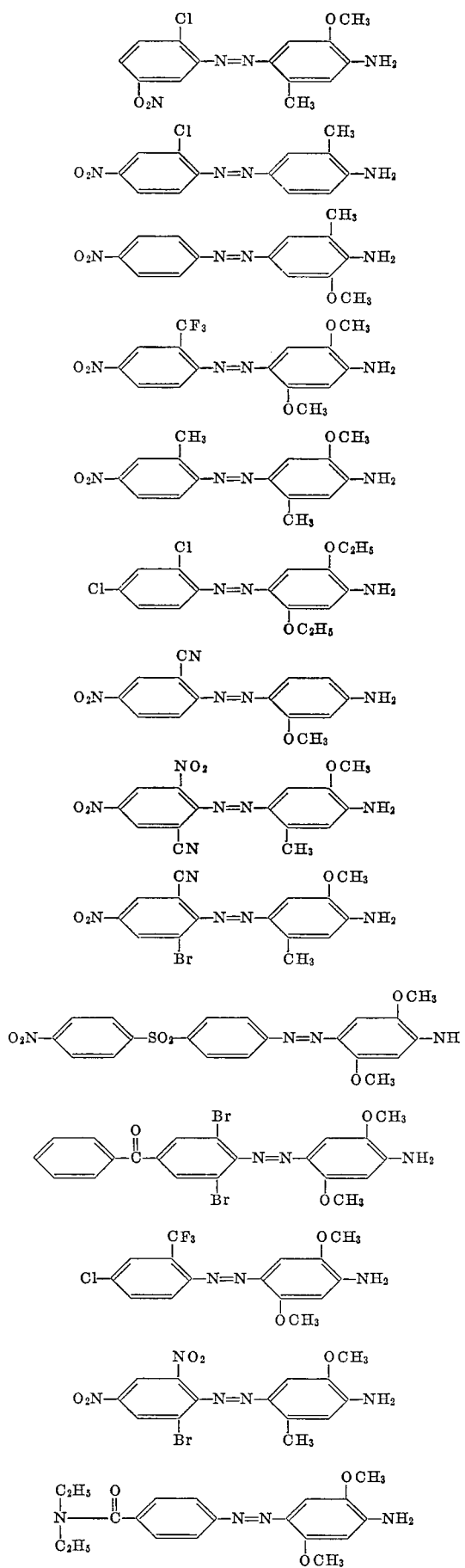
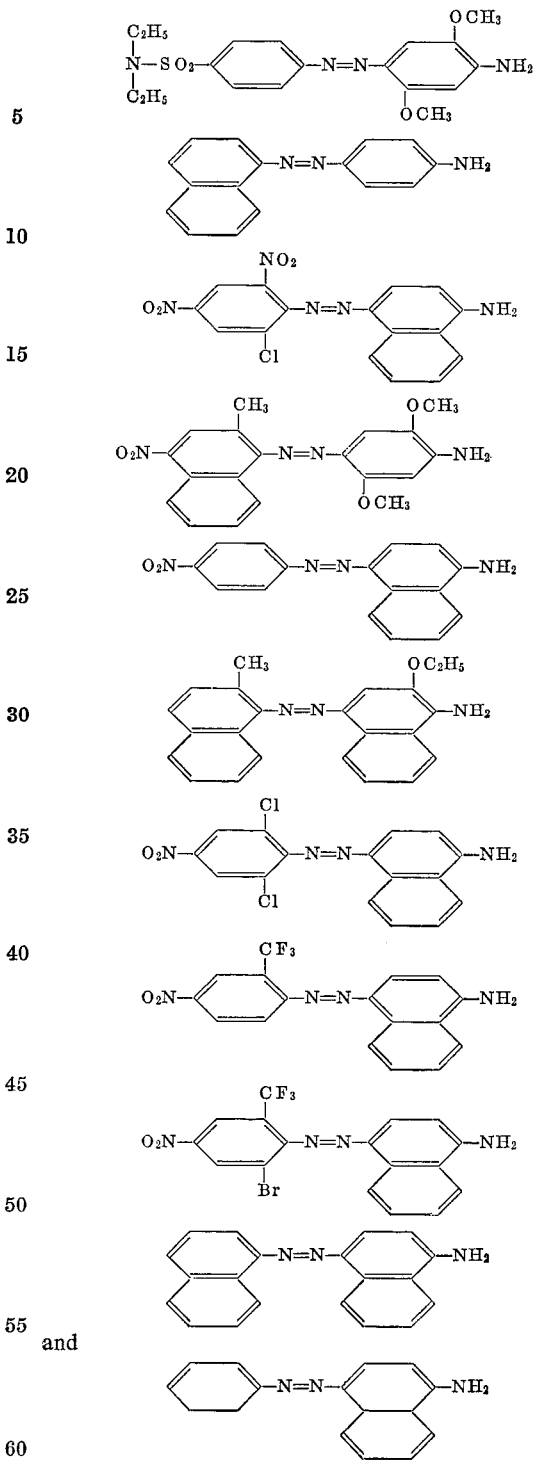

All of the above azo arylamines are readily prepared by conventional diazo chemistry. As is well known in the art, when preparing azo arylamines by diazotization of a highly electronegatively substituted aniline such as 2,4-dinitro-6-bromoaniline, 2,6-dichloro-4-nitroaniline, 4-benzoyl-2,6-dibromoaniline, 2,4-dinitro-6-cyanoaniline, 2,4-dinitro-6-chloroaniline or 2-cyano-6-bromo-4-nitroaniline, nitrosyl sulfuric acid is required.

The diazotization can be carried out by first preparing an aqueous mineral acid solution, preferably hydrochloric acid. The arylamine is then added, and the mixture is stirred until solution is complete. Ice is then added to reduce the temperature to about 25° to —5° C., followed by the addition of a slight excess of sodium nitrite while maintaining the temperature at about 25° to −5° C. A strong test for nitrous acid and acidity to Congo Red should be maintained throughout the diazotization. After all the nitrite has been added, the solution is agitated for an additional 10–30 minutes. When diazotization is completed, a filter aid may be added and the solution filtered to remove any unreacted starting material or tarry impurities.

At the end of the diazotization, the diazo should be coupled immediately to the pyrazolone to avoid losses due to diazo decomposition. If an unexpected delay occurs, the diazo should be cooled with ice to 5° C. until the pyrazolone solution used in the coupling step is ready. Just before the coupling reaction, the excess nitrous acid in the diazo solution is destroyed by addition of sulfamic acid.

(b) Coupling reaction

The coupling components which are useful in preparing the aryl azo pyrazolone basic dyes are 3-substituted pyrazolones of the formula

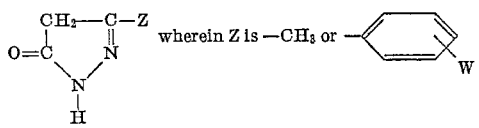

in which W is H, Cl, Br, NO$_2$, alkyl or alkoxy and is in the meta or para position. The preferred coupling components are 3-methyl - 2 - pyrazolin - 5 - one and 3-phenyl - 2 - pyrazolin - 5 - one. These 3-substituted pyrazolones are old compounds which are prepared by the reaction of hydrazine with ethyl acetoacetate or ethyl benzoylacetate, respectively. Ethylbenzoylacetate is prepared by a crossed Claisen condensation of ethyl benzoate with ethyl acetate, in the presence of strong base, as illustrated below:

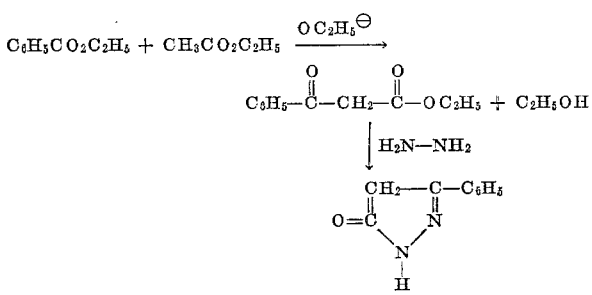

Substituted 3-phenyl - 2 - pyrazolin - 5 - ones are readily available by similar reactions, starting with ethyl acetate and a substituted ethyl benzoate, provided that the substituent does not interfere with the Claisen condensation or subsequent reaction with hydrazine. Non-interfering substituents include Cl, Br, NO$_2$, alkyl, and alkoxy groups in positions meta and para to the carboethoxy group.

A convenient method for carrying out the coupling reaction is by first adding the pyrazolone to water and stirring to obtain a smooth slurry. Sodium hydroxide is then added to yield a clear solution of the pyrazolone. During this procedure, the temperature is held at about 20±2° C. and the pH of the resulting solution is approximately 9.7±0.3. A small quantity of a nonionic surface-active agent may be added to the diazo solution, followed by the addition of the pyrazolone solution over a period of about 20 minutes, holding the temperature at about 5° to 25° C. In general a slight excess of pyrazolone coupling component is used over the diazo, but as in most all azo chemistry, the proportions of diazo to coupling component are approximately stoichiometric, that is, about mole for mole. The pH at the end of the addition will be in the range of about 1.5–2; a yellow precipitate of azo pyrazolone will form. Coupling is completed by raising the pH to 4–5.0 by the addition of sodium acetate; coupling should be complete in about 30–60 minutes at this latter pH. As coupling proceeds the slurry will become quite thick; water may be added as required to afford good mixing.

(c) Formaldehyde and amine reaction

The formaldehyde used to prepare aryl azo pyrazolone dye bases may be added as formaldehyde or an agent yielding formaldehyde such as paraformaldehyde or trioxane. The formaldehyde is most conveniently added as an aqueous solution. However, it may also be added in the vapor phase, as generated by heating paraformaldehyde or trioxane.

The secondary amines which are useful in the synthesis of the cationic dyes of this invention are of the Formula R$^1$–NH–R$^2$ wherein R$^1$ and R$^2$ are alkyl or together with the attached nitrogen form an alicyclic ring of the structure:

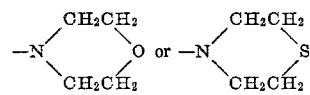

The preferred secondary amines are dimethylamine and diethylamine. Other suitable amines include methylethylamine, di-n-propylamine, dibutylamine, morpholine, and thiomorpholine.

Although the azo pyrazolone can be reacted first with formaldehyde and then with the amine, it is preferable to carry out the condensation with formaldehyde and amine as a single step. The reaction can be carried out at temperatures in the range of about 10–100° C. and preferably at 50–80° C. At least one mole of formaldehyde and one mole of amine should be used per mole of azo pyrazolone, and preferably an excess should be used, for example, two moles of formaldehyde and two moles of amine per mole of azo pyrazolone.

A convenient method for carrying out the condensation with formaldehyde and secondary amine is by first dissolving sodium hydroxide in water and gradually adding this solution to the azo pyrazolone slurry to raise the pH to 8.5±0.3. Then, a secondary amine conveniently handled as an aqueous solution, is added below the surface of liquid layer, followed by addition of formaldehyde, also conveniently as an aqueous solution. These additions are made with the reaction slurry at ambient temperature. The amine addition will cause the pH of the dye slurry to rise to 10.5–11.5, and will cause some dye to dissolve. After the addition of the formaldehyde, the pH of the reaction mass will be about 9.6–10.0. There will be about a 5° C. temperature rise due to the exothermic heat of reaction. If the pH at this point is greater than 10.4, hydrochloric acid should be added to adjust the pH to 10.0±0.4. The reaction mass is stirred at ambient temperature for one hour, then heated to 65° C. and held for two hours to attempt to force the reaction to completion.

If the dye base is appreciably soluble at a pH of 10.0±0.4 as in the case of monoazo dye bases, the pH should be lowered to 8.5±0.3, by the addition of hydrochloric acid, before isolating the dye base by filtration. The dye base product is filtered, washed with water to remove excess amine and formaldehyde, and dried at 70–75° C.

The aryl azo pyrazolone dye bases prepared in this manner are particularly useful as intermediates for forming cationic, aryl monoazo and disazo, 3-substituted-1-aminomethylpyrazolone dyes. These cationic dyes are prepared by quaternizing the above dye bases and are useful for dyeing and printing acid-modified polyacrylonitrile, acid-modified polyethylene terephthalate and acid-modified polyamide fibers.

(3) Examples

The following examples, illustrating the novel process of this invention and the novel dyes produced thereby, are given without any intention that the invention be limited thereto. All parts and percentages are by weight.

EXAMPLE 1

This example illustrates the preparation of the azo thiazole-pyrazolone dye of the structure:

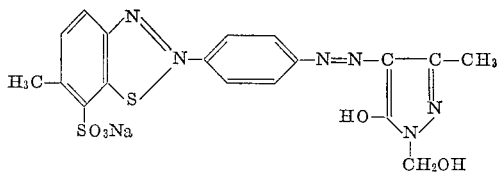

96.0 parts of dehydrothio-p-toluidine sulfonic acid are added with stirring to 1050.0 parts of water. Approximately 12.1 parts of sodium hydroxide are then added to give a clear solution with a pH of about 10. The temperature of the solution is adjusted to 22±3° C. and 21.0 parts of sodium nitrite are added and stirred into solution. This solution is then added during 15 minutes with good agitation to a solution of 240.0 parts of water and concentrated hydrochloric acid (containing 27.0 parts of 100% HCl) initially at a temperature of 15±5° C. During the addition, the temperature of the slurry is not allowed to rise above 25° C., ice being added to the slurry if needed. When the addition is completed, the slurry is stirred for one hour at T=22±3° C., maintaining a strong test for acid on Congo Red paper and a strong test for nitrous acid on starch-iodide paper. Then the excess nitrous acid is destroyed with about 0.5 part of sulfamic acid. The slurry is then added with good stirring during the course of 60 minutes to solution of coupler prepared in the following manner.

32.3 parts of 3-methyl-5-pyrazolone are mixed with 1000 parts of water and approximately 13.2 parts of sodium hydroxide as an aqueous solution are added with stirring to yield a clear solution with a pH=9.2±3. 80 parts of sodium carbonate are then added and stirred into solution. Ice and water are then added to give 1500 parts of solution at a temperature of 10±2° C. with a pH of about 10.5.

During the addition of the diazo to the coupler, the temperature of the coupler-dye mixture is maintained at 12±4° C. and the pH is held at 9.5 or over, additional sodium carbonate being added if necessary. When the coupling is complete, the clear red solution, which may contain some precipitated dye, is heated to 23±3° C. with agitation, 14.9 parts of 100% formaldehyde are added as a 37% solution and the mixture is stirred at pH 9.8±0.8 for 30 minutes. The reaction mass should be a clear red solution.

The reaction mass is heated with steam to about 70° C. and 570 parts of salt are added, maintaining stirring. The dye will precipitate in a sandy, brownish-yellow form or will be converted to such form on stirring for less than 30 minutes. A sample of the reaction mass streaked on paper will show a faint yellow bleed. The slurry is then filtered and dried at 100±10° C. to yield about 135 parts of pure dye admixed with a small amount of sodium chloride and sodium carbonate. The product is an orange powder which readily forms aqueous solutions containing about 7% dye at room temperature. Such solutions have a pH of about 9.5. The dye has an absorption maximum at about 425 millimicrons and dyes paper an attractive yellow shade utilizing the methods described in Example 4.

EXAMPLE 2

This example illustrates the preparation of the azo thiazole-pyrazolone dye of the structure:

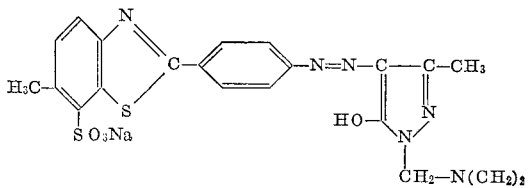

96.0 parts of dehydrothio-p-toluidine sulfonic acid are added with stirring to 1050 parts of water. Approximately 12.1 parts of sodium hydroxide are then added to give a clear solution with a pH of about 10. The temperature of the solution is adjusted to 22±3° C. and 21 parts of sodium nitrite are added and stirred into solution. This solution is then added during 15 minutes with good agitation to a solution (note: provided temperature is maintained, the time of addition is not critical), of 450 parts of water and concentrated hydrochloric acid (containing 39.5 parts of 100% HCl) to which about 150 parts of ice are added to give a final temperature of 0±3° C. During the addition, the temperature of the slurry is not allowed to rise above 5° C., ice being added to the slurry if needed. When the addition is completed, the slurry is stirred for one hour at T=5±5° C., maintaining a strong test for acid on Congo Red paper and a strong test for nitrous acid on starch-iodide paper. Then, the excess nitrous acid is destroyed with about 0.5 part of sulfamic acid. The slurry is then diluted with ice and water to about 2500 parts at 5±5° C. To this slurry is added, with good stirring, a solution at 8±2° C. prepared as follows: 32.3 parts of 3-methyl-5-pyrazolone is added to 600 parts of water and with agitation, about 13.2 parts of sodium hydroxide as an aqueous solution are added to give a clear solution with a pH=9.2±0.3. About 90 parts of ice are then added to cool the solution to 8±2° C. The temperature in the diazo slurry is maintained below 10° C. during the addition of the coupler. Then the volume of the reaction mixture is adjusted to 3500 parts at a temperature of 8±1° C. A solution of about 60 parts of sodium carbonate in 200 parts of water (T=<40° C.) is added as rapidly as possible to reaction mixture with good agitation. The dye slurry should be at 10±2° C. with a pH=8.5±.5. The mixture containing partially precipitated dye is then stirred at 10±2° C. for one hour. It is then heated with stirring to 23±2° C. and the pH adjusted so that it is 8.5±0.5.

14.9 parts of 100% formaldehyde are then added with agitation and the stirring continued for about one hour while the temperature is slowly raised to 35±5° C. At this point, the reaction mixture is a clear red solution. 22.3 parts of dimethylamine as 25% aqueous solution are then added, and the mixture stirred for at least one hour. The mixture is then heated to 70° C., the pH adjusted to 8–8.5 and about 570 parts of salt added with good stirring. The dye will precipitate as a granular red solid or will be converted to such a form upon 30 minutes stirring at temperatures between 50 and 70° C. The dye is then filtered and dried in air or in vacuum at 100° C. to give a dark red powder which readily forms 10% solution in water and which exhibits an absorption maximum at about 425 millimicrons in water.

EXAMPLE 3—VARIATION OF AMINE

After stiring at pH 0.9±0.8 for 30 minutes in Example 1 or in place of adding dimethylamine as in Example 2, the following amines may be added:

(a) Piperidine: 42.2 parts
(b) Methylcyclohexylamine: 55.5 parts
(c) Diethanolamine: 52.2 parts
(d) Ethylamine: 22.3 parts (as 70% aqueous solution)
(e) NH₄OH: 8.5 parts (as NH₃)

The reaction mixture is allowed to stir for one hour and then heated and isolated as described in Examples 1 and 2. These products exhibit absorption maxima similar to the dyes of Examples 1 and 2 and show similar dyeing properties.

EXAMPLE 4—PAPER DYEING (a) One thousand parts of bleached sulfite pulp are dispersed in 18,000 parts of water. One part of the azo thiazolepyrazolone dye prepared in Example 1, 15 parts of rosin size, and 25 parts of Paper Makers Alum (commercial aluminum sulfate, Al₂(SO₄)₃·18H₂O) are added and the mixture is agitated for about 0.5 hour. Paper sheet is then formed by conventional procedures to yield paper which is dyed an attractive yellow shade.

(b) When the process described in part (a) of the present example is repeated, except that rosin size is omitted, a yellow paper is obtained which is colored to the same depth as that obtained when the rosin size is used.

EXAMPLE 5—BLEACHING PROCESS

Five parts of colored paper, prepared as described in Example 4(a), and 95 parts of water are agitated at 140° F. (60° C.). Calcium (or sodium) hypochlorite is added to provide 1% available chlorine, based on the air-dry weight of the colored paper. The slurry is agitated at 135–140° F. (57–60° C.) for 45 minutes. After adding 0.025 part of sodium acid sulfate, the slurry is agitated for 5 minutes and then diluted with cold water to provide a 0.5% concentration of paper fiber in the slurry. Paper sheet is then made up according to the manner well known in the art of paper making to provide paper which is free of color.

When deeply colored paper is bleached, the amount of available chlorine used in the present example is increased to about 3%.

EXAMPLE 6—VARIATION OF ALKALI METAL

Lithium analogues of the dyes of Examples 1 and 2 are prepared by substituting chemically equivalent quantities of lithium salts in place of sodium salts used in these examples. In similar fashion, potassium analogues of Examples 1 and 2 can be prepared using potassium salts in place of the sodium salts of Examples 1 and 2. These analogues show essentially the same dyeing properties of the sodium salt and exhibit similar absorption maxima.

EXAMPLE 7

This example illustrates the preparation of the aryl monoazo pyrazolone dye base of the structure:

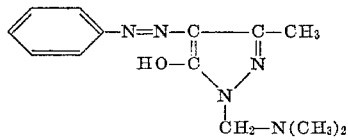

Aniline (18.6 parts) is added to 300 parts of water and ice containing 49.6 parts of 37% hydrochloric acid solution. With the temperature at −5° C., 14.1 parts of sodium nitrite are added rapidly as a 30% solution to prepare the aniline diazo. After stirring at about 0° C. for 15 minutes, the excess nitrous acid present is destroyed by the addition of a small amount of sulfamic acid. A solution of 3-methylpyrazolone is prepared by dissolving 19.6 parts of 3-methylpyrazolone in 500 parts of ice and water containing 8.0 parts of sodium hydroxide and 30 parts of sodium carbonate. The aniline diazo solution is added to the 3-methylpyrazolone solution causing a yellow precipitate of phenylazo-3-methylpyrazolone to form. The resulting pH of this slurry is 9.6. To this azo pyrazolone slurry are added 11.1 parts of formaldehyde as a 37% solution and 15 parts of dimethylamine as a 25% solution and the reaction mixture is allowed to stand for 48 hours at about 25° C. with occasional stirring. The tertiary amino dye base having structure indicated above is isolated by filtration, washed with water, and dried in a vacuum oven at 45° C.

EXAMPLE 8

This example illustrates the preparation of the aryl monoazo pyrazolone dye base of the structure:

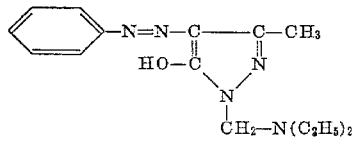

Diazotization of 46.5 parts (0.5 mole) of aniline and coupling to 3-methylpyrazolone are carried out in a manner similar to that outlined in Example 7. Seventy-three parts (1 mole) of diethylamine and 30 parts of formaldehyde, as a 37% aqueous solution, are added to the azo pyrazolone slurry. After stirring the slurry overnight, the reaction mass is heated to 40° C. and held at this temperature for one hour. The tertiary amino dye base is isolated by filtration, washed with water and dried at 55° C. in a vacuum oven to yield 139.5 parts.

EXAMPLE 9

This example illustrates the preparation of the aryl monoazo pyrazolone dye base of the structure

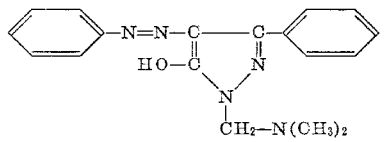

The diazotization of 18.6 parts of aniline is carried out essentially as in Example 7. A solution of 3-phenylpyrazolone is prepared by dissolving 35 parts of 3-phenylpyrazolone in 500 parts of water containing 8.8 parts of sodium hydroxide. After destroying excess nitrous acid in the diazo solution by the addition of sulfamic acid, the coupler solution of 3-phenyl-pyrazolone is added to the aniline diazo solution over a 15-minute period. Coupling to form a yellow azo pyrazolone is promoted by increasing the pH to 4.8 by the addition of 20 parts of anhydrous sodium acetate.

Coupling is complete when there is obtained a negative test for the diazo when spotting the dye slurry on spot paper with alkaline "R" salt solution. The pH of the dye slurry is adjusted to 8.0 by the addition of an aqueous solution of sodium hydroxide and 11.1 parts of formaldehyde as a 37% solution and 15 parts of dimethylamine as a 25% aqueous solution are added. Within an hour there is a noticeable change in the appearance of the yellow precipitate to a more orange color and the slurry becomes quite thick. After stirring the slurry all night at room temperature the product is isolated by filtration, washed with water and dried giving nearly a theoretical weight yield of the desired tertiary amine dye base.

EXAMPLE 10

This example illustrates the preparation of the aryl monoazo pyrazolone dye base of the structure:

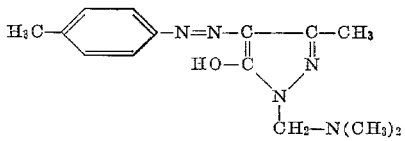

53.5 parts of para-toluidine (0.5 mole), heated to about 50° C. to melt the material, are added to 700 parts of water containing 48 parts of hydrochloric acid. Ice is added to reduce the temperature to −5° to 0° C. and 36 parts sodium nitrite as a 30% solution are added rapidly to the p-toluidine solution to form the diazo. After stirring at 0° C. for approximately 15 minutes, the small excess of nitrous acid present is destroyed by the addition of sulfamic acid.

A coupler solution containing 52 parts of 3-methylpyrazolone and 21.5 parts of sodium hydroxide in 500 parts of water is added to the p-toluidine diazo solution. The pH is adjusted to 5 by the addition of 40 parts of sodium acetate in order to promote the coupling and form the water insoluble yellow dye. The pH of the slurry is then adjusted to 8.5 by the addition of dilute sodium hydroxide and 45 parts of dimethylamine as a 25% aqueous solution and 30 parts of formaldehyde as a 37% aqueous solution are added. These reactants tended to make the dye dissolve and then reprecipitate in

17 a different physical form as the tertiary amine base. After stirring the slurry overnight at about 25° C. the precipitate is isolated by filtration, washed with water and dried in vacuum at 60° C. An excellent yield (130 parts) of the desired tertiary amine dye base is obtained.

EXAMPLE 11

This example illustrates the preparation of the aryl disazo pyrazolone dye base of the structure:

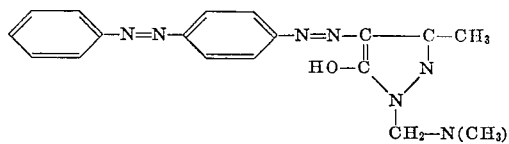

187 parts (0.6 mole) of aminoazobenzene hydrochloride are dispersed and partially dissolved in 1800 parts of water containing 44.5 parts of hydrochloric acid. With the temperature adjusted to 21° C., 44.7 parts of sodium nitrite are added over a 30 minute period as a 30% solution. After an additional 20-minute period the diazo solution is filtered.

A solution containing 60.3 parts of 3-methylpyrazolone is prepared by adding the pyrazolone to 1200 parts of water containing 24 parts of sodium hydroxide. The pyrazolone solution is added to the diazo solution from which excess nitric acid has been removed by the addition of sulfamic acid. The pH is adjusted to 4.2 by the addition of 150 parts of anhydrous sodium acetate. At this pH coupling proceeds rapidly to form a yellow-orange precipitate of the disazo pyrazolone.

The pH of the slurry is then increased to 8.5 by the addition of dilute sodium hydroxide solution and 54 parts (1.2 mole) of dimethylamine, as a 25% aqueous solution, and 36 parts (1.2 mole) of formaldehyde, as 37% aqueous solution, are added. The resulting dye slurry having a pH of about 10 is heated to 50 to 55° C. with good agitation and held for a period of 2 hours at this temperature range. The dye gradually changes to a reddish-orange essentially water-insoluble product. The tertiary amine dye base is isolated by filtration, washed with water and dried in vacuum at 55° C. The yield of dye base is 89% of the theoretical yield based on the starting aminoazobenzene hydrochloride.

EXAMPLES 12 TO 26

Following the general procedure outlined in Example 11, additional aryl azo pyrazolone dye bases of the structure:

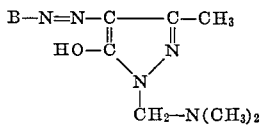

in which B is as designated in Table 1, are prepared.

TABLE 1

| Example: | B |
|---|---|
| 12 | H₃C—⬡—CH₃ (para-xylyl) |
| 13 | Cl—⬡— |
| 14 | ⬡ with Cl, Cl |
| 15 | ⬡—NO₂ |
| 16 | CH₃O—⬡— |
| 17 | O₂N—⬡— with Cl |
| 18 | ⬡ with CH₃, CH₃ |
| 19 | naphthyl |
| 20 | ⬡(CH₃)—N=N—⬡(CH₃)— |
| 21 | O₂N—⬡(Cl)—N=N—⬡(CH₃)—OCH₃ |
| 22 | O₂N—⬡—N=N—⬡(CH₃)—OCH₃ |
| 23 | O₂N—⬡(Cl)—N=N—⬡(OCH₃)—OCH₃ |
| 24 | CH₃O—⬡—N=N—⬡(OCH₃)—OCH₃ |
| 25 | ⬡—N=N—naphthyl |
| 26 | O₂N—⬡—N=N—naphthyl |

Although the invention has been described and exemplified by way of specific embodiments, it is to be understood that it is not limited thereto. As will be apparent to those skilled in the art, numerous modifications and variations of the embodiments illustrated above may be made without departing from the spirit of the invention.

The embodiments of the invention in which an exclusive property or privilege is claimed are defined as follows:

1. Azo, 3-substituted pyrazolone dye of the structure:

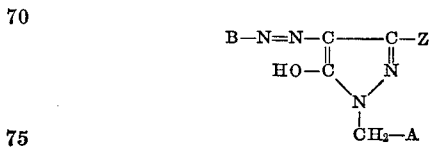

wherein

B is H₃C― 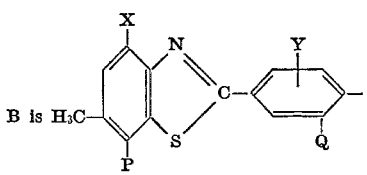

Ar— or Ar—N=N—Ar'— in which each of X and Y is H or CH₃, one of P and Q is SO₃M, the other is H or SO₃M, and M is alkali metal or ammonium, Ar is phenyl or naphthyl which is substituted with 0 to 3 substituents selected from the group consisting of Cl, Br, NO₂, CN, alkyl, alkoxy, CF₃, phenylcarbonyl, phenylsulfonyl, N,N-dialkyl carboxamido and N,N-dialkyl sulfonamido, and Ar' is phenylene, naphthylene or biphenylylene which is substituted with 0 to 2 substituents selected from the group consisting of alkyl and alkoxy;

Z is alkyl or

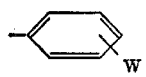

in which W is H, Cl, Br, NO₂, alkyl or alkoxy, and is in the meta or para position; and A is —OH or —NR¹(R²) in which each of R¹ and R² is H, alkyl, —CH₂CH₂OH, or cyclohexyl or R¹ and R² together with the attached nitrogen are piperidino, morpholino or thiomorpholino, with each alkyl and alkoxy group recited above having 1 to 4 carbon atoms.

2. An azo, 3-substituted pyrazolene dye of claim 1 has the structure:

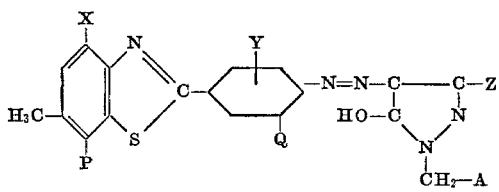

wherein each of X and Y is H or CH₃; one of P and Q is SO₃M, the other is H or SO₃M, and M is alkali metal or ammonium, Z is alkyl having 1 to 4 carbon atoms; and A is —OH, —NH₂, NHCH₃, —NHC₂H₅, —N(CH₃)₂, —N(C₂H₅)₂, —NCH₃(cyclohexyl), —N(C₂H₅OH)₂ or piperidino.

3. An azo, 3-substituted pyrazolone dye of claim 1 which has the structure:

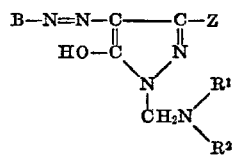

wherein B is AR— or AR—N—N—Ar'— in which

Ar is phenyl or naphthyl which is substituted with 0 to 3 substituents selected from the group consisting of Cl, Br, NO₂, CN, alkyl, alkoxy, CF₃, phenylcarbonyl, phenylsulfonyl, N,N-dialkyl carboxamido and N,N-dialkyl sulfonamido, and Ar' is phenylene, naphthylene or biphenylylene which is substituted with 0 to 2 substituents selected from the group consisting of alkyl and alkoxy;

Z is —CH₃ or

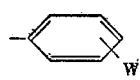

in which

W is H, Cl, Br, NO₂, alkyl or alkoxy and is in the meta or para position; and each of R¹ and R² is alkyl or R¹ and R² together with the attached nitrogen are morpholino or thiomorpholino, with each alkyl and alkoxy group recited above having 1 to 4 carbon atoms.

4. An azo thiazole-pyrazolone dye of claim 1 which has the structure:

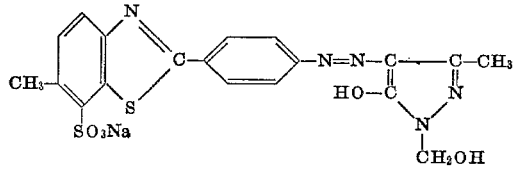

5. An azo thiazole-pyrazolone dye of claim 1 which has the structure:

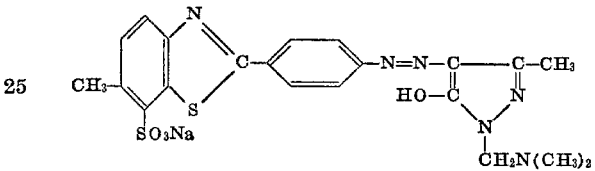

6. An azo thiazole-pyrazolone dye of claim 1 which has the structure:

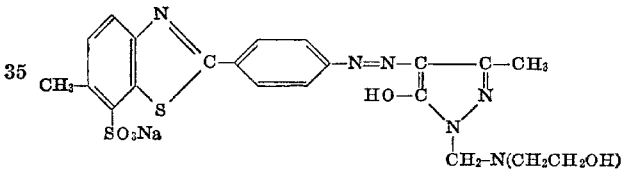

7. An aryl azo pyrazolone dye of claim 3 which has the structure:

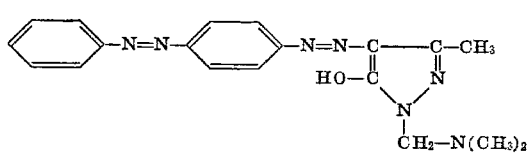

8. An aryl azo pyrazolone dye of claim 3 which has the structure:

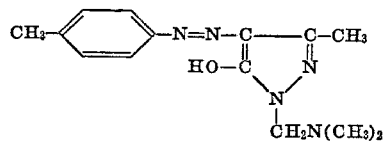

References Cited

UNITED STATES PATENTS

| | | | |
|---|---|---|---|
| 2,853,481 | 9/1958 | Strobel et al. | 260—162X |
| 2,883,392 | 4/1959 | Karmas et al. | 260—310 |
| 2,928,842 | 3/1960 | Karmas | 260—310 |
| 3,152,114 | 10/1964 | Siegel et al. | 260—158X |
| 3,324,105 | 6/1967 | Hanke et al. | 260—162X |
| 3,341,513 | 9/1967 | Wegmuller et al. | 260—160 |
| 3,426,010 | 2/1969 | Dunworth | 260—158 |

FLOYD D. HIGEL, Primary Examiner

U.S. Cl X.R.

8—7, 19, 41; 117—152; 260—152, 160, 162, 163, 196, 205, 206, 207, 243, 247, 304, 310